United States Patent
Zhang et al.

(10) Patent No.: US 10,798,596 B2
(45) Date of Patent: *Oct. 6, 2020

(54) MEASUREMENT METHOD, CONFIGURATION METHOD, RELATED DEVICE, AND SYSTEM

(71) Applicant: HUAWEI TECHNOLOGIES CO., LTD., Shenzhen, Guangdong (CN)

(72) Inventors: Jian Zhang, Shenzhen (CN); Qinghai Zeng, Shanghai (CN); Hongping Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,334

(22) Filed: Mar. 12, 2019

(65) Prior Publication Data

US 2019/0215708 A1 Jul. 11, 2019

Related U.S. Application Data

(63) Continuation of application No. 15/217,452, filed on Jul. 22, 2016, now Pat. No. 10,244,415, which is a
(Continued)

(51) Int. Cl.
*H04W 24/02* (2009.01)
*H04W 24/08* (2009.01)
(Continued)

(52) U.S. Cl.
CPC ........... *H04W 24/08* (2013.01); *H04W 24/02* (2013.01); *H04W 36/0085* (2018.08);
(Continued)

(58) Field of Classification Search
CPC ..................................................... H04W 24/02
See application file for complete search history.

(56) References Cited

U.S. PATENT DOCUMENTS 9,560,662 B2 * 1/2017 Siomina ................ H04W 24/10
2008/0259811 A1 10/2008 Cordeiro et al.
(Continued)

FOREIGN PATENT DOCUMENTS

| CN | 101268711 A | 9/2008 |
|---|---|---|
| CN | 103069882 A | 4/2013 |

OTHER PUBLICATIONS

U.S. Appl. No. 15/217,452, filed Jul. 22, 2016, Jian Zhang et al., Huawei Technologies Co., Ltd.

*Primary Examiner* — Ayanah S George
(74) *Attorney, Agent, or Firm* — Slater Matsil, LLP

(57) ABSTRACT

Embodiments of the present invention disclose a measurement method, including: acquiring, by user equipment, a status of using a target unlicensed frequency band by a target radio access technology RAT; and selecting, by the user equipment, a corresponding measurement mode according to the usage status to measure a radio condition of the target unlicensed frequency band. The embodiments of the present invention further disclose user equipment, a network device, and a system. In the present invention, the user equipment can accurately measure the radio condition of the unlicensed frequency band, so as to provide reference information for the network device to schedule the user equipment.

18 Claims, 8 Drawing Sheets

---

User equipment acquires a status of using a target unlicensed frequency band by a target radio access technology RAT  — S101

↓

The user equipment selects a corresponding measurement mode according to the usage status to measure a radio condition of the target unlicensed frequency band  — S102

Related U.S. Application Data continuation of application No. PCT/CN2014/071335, filed on Jan. 24, 2014.

(51) Int. Cl.
  *H04W 36/00* (2009.01)
  *H04W 72/04* (2009.01)
  *H04W 72/12* (2009.01)
  *H04W 36/14* (2009.01)
  *H04W 48/18* (2009.01)

(52) U.S. Cl.
  CPC ... *H04W 72/0453* (2013.01); *H04W 72/1231* (2013.01); *H04W 36/0094* (2013.01); *H04W 36/14* (2013.01); *H04W 48/18* (2013.01)

(56) References Cited

U.S. PATENT DOCUMENTS

| | | | |
|---|---|---|---|
| 2012/0039284 A1* | 2/2012 | Barbieri | H04W 48/10 370/329 |
| 2012/0281563 A1* | 11/2012 | Comsa | H04W 24/10 370/252 |
| 2012/0281594 A1* | 11/2012 | Stewart | H04W 16/14 370/259 |
| 2013/0143502 A1* | 6/2013 | Kazmi | H04W 88/06 455/62 |
| 2013/0165134 A1 | 6/2013 | Touag et al. | |

* cited by examiner

A network device sends measurement configuration information to user equipment, where the measurement configuration information is used to instruct the user equipment to configure a first measurement mode and a second measurement mode — S301

MEASUREMENT METHOD, CONFIGURATION METHOD, RELATED DEVICE, AND SYSTEM

CROSS-REFERENCE TO RELATED APPLICATIONS

This application is a continuation of U.S. patent application Ser. No. 15/217,452, filed on Jul. 22, 2016, which is a continuation of International Application No. PCT/CN2014/071335, filed on Jan. 24, 2014. All of the afore-mentioned patent applications are hereby incorporated by reference in their entireties.

TECHNICAL FIELD

The present invention relates to the communications field, and in particular, to a measurement method, a configuration method, related devices, and a system.

BACKGROUND

With rapid development of a packet service and intelligent terminals, a high-speed service with a large data volume has an increasing requirement for spectrums. According to the latest-released FCC international spectrum white paper, unlicensed spectrum resources are more than licensed spectrum resources. An unlicensed spectrum includes frequency bands used for devices for industrial, scientific, and medical (ISM) purposes, and the like. For example, there are three frequency bands: 902 to 928 MHz, 2400 to 2484.5 MHz, and 5725 to 5850 MHz in the United States, and 2.4 GHz is a common ISM band for all counties. Main technologies used in the ISM band are Wireless Fidelity (WiFi), which is also referred to as a wireless local area network (WLAN, wireless local network), Bluetooth, ZigBee, and the like. WiFi is based on standards in the Institute of Electrical and Electronics Engineers (IEEE) 802.11 family, for example, 802.11a, 802.11n, 802.11ac. WiFi has low efficiency in aspects such as quality of service (QoS) and multi-user scheduling, and has a limited mobility management function. Therefore, by applying a Long Term Evolution (LTE) system of the 3rd Generation Partnership Project (3GPP) to the unlicensed spectrum, the licensed spectrum resources can be used more efficiently, and spectrum bandwidth available to an LTE user can be increased. Not only the ISM band is used, but a licensed frequency band may also be shared in LTE in an authorized shared access (ASA, authorized shared access; or LSA, licensed shared access) manner, for example, by using a television white space (TVWS). In this case, an authorized user takes priority over a secondary user, that is, an unauthorized user that shares the licensed frequency band.

The prior art mainly describes, from aspects such as an architecture, signaling, and spectrum coordination, a basic solution framework and a basic process in which multiple RATs share unlicensed spectrum usage information by using a CPC, but does not disclose a technology of how a RAT supports an unlicensed spectrum and a method of how a RAT detects and measures an unlicensed spectrum.

SUMMARY

A technical problem to be resolved by embodiments of the present invention is to provide a measurement method, a configuration method, user equipment, a network device, and a communications system. The user equipment can accurately measure a radio condition of an unlicensed frequency band, so as to provide reference information for the network device to schedule the user equipment.

To achieve the foregoing objective, a first aspect of the present invention provides a measurement method, including:

acquiring, by user equipment, a status of using a target unlicensed frequency band by a target radio access technology RAT; and selecting, by the user equipment, a corresponding measurement mode according to the usage status to measure a radio condition of the target unlicensed frequency band.

With reference to the first aspect, in a first possible implementation manner, the step of selecting, by the user equipment, a corresponding measurement mode according to the usage status to measure a radio condition of the target unlicensed frequency band includes:

if the user equipment determines that the target RAT already occupies the target unlicensed frequency band, selecting a first measurement mode to measure the radio condition of the target unlicensed frequency band, where the first measurement mode indicates measurement performed based on a reference signal, a synchronization signal, or system information of the target RAT; or if the user equipment determines that the target RAT does not occupy the target unlicensed frequency band, selecting a second measurement mode to measure the radio condition of the target unlicensed frequency band, where the second measurement mode indicates measurement performed based on physical measurement, spectrum analysis, or spectrum sensing for the target unlicensed frequency band.

With reference to the first possible implementation manner of the first aspect, in a second possible implementation manner, the target RAT is a cellular radio access technology, and the step of selecting a first measurement mode to measure the radio condition of the target unlicensed frequency band includes:

selecting, by the user equipment, the first measurement mode to measure the radio condition of the target unlicensed frequency band of a serving cell and/or a neighboring cell, where frequencies of the serving cell and the neighboring cell are the target unlicensed frequency band.

With reference to the second possible implementation manner of the first aspect, in a third possible implementation manner, the step of acquiring, by user equipment, a status of using a target unlicensed frequency band by a target RAT includes:

receiving, by the user equipment, status indication information sent by a serving base station, where the status indication information is used to indicate the status of using the target unlicensed frequency band by the target RAT; and parsing, by the user equipment, the status indication information, so as to obtain the status of using the target unlicensed frequency band by the target RAT; or specifying, by the user equipment, a subframe in a preset radio frame, so as to detect the status of using the unlicensed frequency band by the target RAT.

With reference to the third possible implementation manner of the first aspect, in a fourth possible implementation manner, before the step of acquiring, by user equipment, a status of using an unlicensed frequency band by a target RAT, the method further includes:

receiving, by the user equipment, measurement configuration information sent by the serving base station, and configuring the first measurement mode and the second measurement mode according to the measurement configuration information.

With reference to the fourth possible implementation manner of the first aspect, in a fifth possible implementation manner, the method further includes:

if a preset trigger condition is met, reporting, by the user equipment, a measurement result including the radio condition to the serving base station.

With reference to the fourth or the fifth possible implementation manner of the first aspect, in a sixth possible implementation manner, the serving base station is a secondary eNodeB SeNB, and the step of reporting, by the user equipment, a measurement result including the radio condition to the serving base station includes:

reporting, by the user equipment, the measurement result including the radio condition to the SeNB, so that the SeNB reports the measurement result to a master eNodeB MeNB to which the SeNB belongs.

With reference to the fourth or the fifth possible implementation manner of the first aspect, in a seventh possible implementation manner, the user equipment performs filtering or averaging processing on radio conditions obtained by means of multiple times of measurement in the first measurement mode or the second measurement mode, and reports the radio condition obtained after the filtering or averaging processing to the serving base station.

A second aspect of the present invention provides a measurement configuration aspect, including:

sending, by a network device, measurement configuration information to user equipment, where the measurement configuration information is used to instruct the user equipment to configure a first measurement mode and a second measurement mode.

With reference to the second aspect, in a first possible implementation manner, the method further includes:

measuring, by the network device, a status of using a target unlicensed frequency band by a target RAT; and sending, by the network device, status indication information to the user equipment, where the status indication information is used to indicate the status of using the target unlicensed frequency band by the target RAT.

With reference to the second aspect, in a second possible implementation manner, the method further includes:

if the network device determines that the target RAT already occupies the target unlicensed frequency band, instructing the user equipment to select the first measurement mode to measure a radio condition of the target unlicensed frequency band; or if the network device determines that the target RAT does not occupy the target unlicensed frequency band, instructing the user equipment to select the second measurement mode to measure a radio condition of the target unlicensed frequency band.

With reference to the first possible implementation manner of the second aspect, in a third possible implementation manner, the method further includes:

if the network device determines that the target RAT already occupies the target unlicensed frequency band, measuring, by the network device, the radio condition of the target unlicensed frequency band based on an uplink reference signal of the user equipment; or if the user equipment determines that the target RAT does not occupy the target unlicensed frequency band, measuring, by the network device, the radio condition of the target unlicensed frequency band based on physical measurement, spectrum analysis, or spectrum sensing for the target unlicensed frequency band.

With reference to the third possible implementation manner of the second aspect, in a fourth possible implementation manner, the target RAT is a cellular radio access technology, and the method further includes:

receiving, by the network device, a measurement result that includes radio conditions of a serving cell and a neighboring cell and that is reported by the user equipment, and scheduling the user equipment according to the measurement result.

A third aspect of the present invention provides user equipment, including:

an acquiring module, configured to acquire a status of using a target unlicensed frequency band by a target radio access technology RAT; and a measurement module, configured to select a corresponding measurement mode according to the usage status to measure a radio condition of the target unlicensed frequency band.

With reference to the third aspect, in a first possible implementation manner, the measurement module includes:

a first measurement module, configured to: if it is determined that the target RAT already occupies the target unlicensed frequency band, select a first measurement mode to measure the radio condition of the target unlicensed frequency band, where the first measurement mode indicates measurement performed based on a reference signal, a synchronization signal, or system information of the target RAT; and a second measurement unit, configured to: if it is determined that the target RAT does not occupy the target unlicensed frequency band, select a second measurement mode to measure the radio condition of the target unlicensed frequency band, where the second measurement mode indicates measurement performed based on physical measurement, spectrum analysis, or spectrum sensing for the target unlicensed frequency band.

With reference to the first possible implementation manner of the third aspect, in a second possible implementation manner, the target RAT is a cellular radio access technology, and the first measurement unit is configured to:

select the first measurement mode to measure the radio condition of the target unlicensed frequency band of a serving cell and/or a neighboring cell, where frequencies of the serving cell and the neighboring cell are the target unlicensed frequency band.

With reference to the second possible implementation manner of the third aspect, in a third possible implementation manner, the acquiring module includes:

a first acquiring unit, configured to: receive status indication information sent by a serving base station, where the status indication information is used to indicate the status of using the target unlicensed frequency band by the target RAT; and parse the status indication information, so as to obtain the status of using the target unlicensed frequency band by the target RAT; and/or a second acquiring unit, configured to specify a subframe in a preset radio frame, so as to detect the status of using the unlicensed frequency band by the target RAT.

With reference to the third possible implementation manner of the third aspect, in a fourth possible implementation manner, the user equipment further includes:

a configuration module, configured to receive measurement configuration information sent by the serving base station, and configure the first measurement mode and the second measurement mode according to the measurement configuration information.

With reference to the fourth possible implementation manner of the third aspect, in a fifth possible implementation manner, the user equipment further includes:

a reporting module, configured to: if a preset trigger condition is met, report a measurement result including the radio condition to the serving base station.

With reference to the fourth or the fifth possible implementation manner of the third aspect, in a sixth possible implementation manner, the serving base station is a secondary eNodeB SeNB, and the reporting module is configured to:

report the measurement result including the radio condition to the SeNB, so that the SeNB reports the measurement result to a master eNodeB MeNB to which the SeNB belongs.

With reference to the fourth or the fifth possible implementation manner of the third aspect, in a seventh possible implementation manner, the reporting module is configured to:

perform filtering or averaging processing on radio conditions obtained by means of multiple times of measurement in the first measurement mode or the second measurement mode, and report the radio condition obtained after the filtering or averaging processing to the serving base station.

A fourth aspect of the present invention provides a network device, including: a first module, configured to send measurement configuration information to user equipment, where the measurement configuration information is used to instruct the user equipment to configure a first measurement mode and a second measurement mode.

With reference to the fourth aspect, in a first possible implementation manner, the network device further includes:

a second module, configured to: measure a status of using a target unlicensed frequency band by a target RAT; and send status indication information to the user equipment, where the status indication information is used to indicate the status of using the target unlicensed frequency band by the target RAT.

With reference to the fourth aspect, in a second possible implementation manner, the network device further includes:

a third module, configured to: if it is determined that the target RAT already occupies the target unlicensed frequency band, instruct the user equipment to select the first measurement mode to measure a radio condition of the target unlicensed frequency band; or if it is determined that the target RAT does not occupy the target unlicensed frequency band, instruct the user equipment to select the second measurement mode to measure a radio condition of the target unlicensed frequency band.

With reference to the second possible implementation manner of the fourth aspect, in a third possible implementation manner, the network device further includes:

a fourth module, configured to: if it is determined that the target RAT already occupies the target unlicensed frequency band, measure the radio condition of the target unlicensed frequency band based on an uplink reference signal of the user equipment; or if it is determined that the target RAT does not occupy the target unlicensed frequency band, measure the radio condition of the target unlicensed frequency band based on physical measurement, spectrum analysis, or spectrum sensing for the target unlicensed frequency band.

With reference to the third possible implementation manner of the fourth aspect, in a fourth possible implementation manner, the target RAT is a cellular radio access technology, and the network device further includes:

a fifth module, configured to: receive a measurement result that includes radio conditions of a serving cell and a neighboring cell and that is reported by the user equipment, and schedule the user equipment according to the measurement result.

A fifth aspect of the present invention provides user equipment, including a processor and a memory, where the memory stores a set of program code, and the processor is configured to invoke the program code stored in the memory to perform the following operations:

acquiring a status of using a target unlicensed frequency band by a target radio access technology RAT; and selecting a corresponding measurement mode according to the usage status to measure a radio condition of the target unlicensed frequency band.

With reference to the fifth aspect, in a first possible implementation manner, that the processor performs the step of selecting a corresponding measurement mode according to the usage status to measure a radio condition of the target unlicensed frequency band includes:

if it is determined that the target RAT already occupies the target unlicensed frequency band, selecting a first measurement mode to measure the radio condition of the target unlicensed frequency band, where the first measurement mode indicates measurement performed based on a reference signal, a synchronization signal, or system information of the target RAT; or if it is determined that the target RAT does not occupy the target unlicensed frequency band, selecting a second measurement mode to measure the radio condition of the target unlicensed frequency band, where the second measurement mode indicates measurement performed based on physical measurement, spectrum analysis, or spectrum sensing for the target unlicensed frequency band.

With reference to the first possible implementation manner of the fifth aspect, in a second possible implementation manner, the target RAT is a cellular radio access technology, and that the processor performs the step of selecting a first measurement mode to measure the radio condition of the target unlicensed frequency band includes:

selecting the first measurement mode to measure the radio condition of the target unlicensed frequency band of a serving cell and/or a neighboring cell, where frequencies of the serving cell and the neighboring cell are the target unlicensed frequency band.

With reference to the second possible implementation manner of the fifth aspect, in a third possible implementation manner, that the processor performs the step of acquiring a status of using a target unlicensed frequency band by a target RAT includes:

receiving status indication information sent by a serving base station, where the status indication information is used to indicate the status of using the target unlicensed frequency band by the target RAT; and parsing the status indication information, so as to obtain the status of using the target unlicensed frequency band by the target RAT; or specifying a subframe in a preset radio frame, so as to detect the status of using the unlicensed frequency band by the target RAT.

With reference to the third possible implementation manner of the fifth aspect, in a fourth possible implementation manner, the processor is further configured to perform:

receiving measurement configuration information sent by the serving base station, and configuring the first measurement mode and the second measurement mode according to the measurement configuration information.

With reference to the fourth possible implementation manner of the fifth aspect, in a fifth possible implementation manner, the processor is further configured to perform:

if a preset trigger condition is met, reporting a measurement result including the radio condition to the serving base station.

With reference to the fourth or the fifth possible implementation manner of the fifth aspect, in a sixth possible implementation manner, the serving base station is a secondary eNodeB SeNB, and that the processor performs the step of reporting a measurement result including the radio condition to the serving base station includes:

reporting, by the user equipment, the measurement result including the radio condition to the SeNB, so that the SeNB reports the measurement result to a master eNodeB MeNB to which the SeNB belongs.

With reference to the fourth or the fifth possible implementation manner of the fifth aspect, in a sixth possible implementation manner, that the processor performs the step of reporting a measurement result including the radio condition to the serving base station includes:

performing filtering or averaging processing on radio conditions obtained by means of multiple times of measurement in the first measurement mode or the second measurement mode, and reporting the radio condition obtained after the filtering or averaging processing to the serving base station.

A sixth aspect of the present invention provides a network device, including a processor and a memory, where the memory stores a set of program code, and the processor is configured to invoke the program code stored in the memory to perform the following operation:

sending measurement configuration information to user equipment, where the measurement configuration information is used to instruct the user equipment to configure a first measurement mode and a second measurement mode.

With reference to the sixth aspect, in a first possible implementation manner, the processor is further configured to perform:

measuring a status of using a target unlicensed frequency band by a target RAT; and sending status indication information to the user equipment, where the status indication information is used to indicate the status of using the target unlicensed frequency band by the target RAT.

With reference to the sixth aspect, in a second possible implementation manner, the processor is further configured to perform:

if it is determined that the target RAT already occupies the target unlicensed frequency band, instructing the user equipment to select the first measurement mode to measure a radio condition of the target unlicensed frequency band; or if it is determined that the target RAT does not occupy the target unlicensed frequency band, instructing the user equipment to select the second measurement mode to measure a radio condition of the target unlicensed frequency band.

With reference to the second possible implementation manner of the sixth aspect, in a third possible implementation manner, the processor is further configured to perform:

if it is determined that the target RAT already occupies the target unlicensed frequency band, measuring the radio condition of the target unlicensed frequency band based on an uplink reference signal of the user equipment; or if it is determined that the target RAT does not occupy the target unlicensed frequency band, measuring the radio condition of the target unlicensed frequency band based on physical measurement, spectrum analysis, or spectrum sensing for the target unlicensed frequency band.

With reference to the third possible implementation manner of the sixth aspect, in a fourth possible implementation manner, the processor is further configured to perform:

receiving a measurement result that includes radio conditions of a serving cell and a neighboring cell and that is reported by the user equipment, and scheduling the user equipment according to the measurement result.

A seventh aspect of the present invention provides a communications system, including any one of the foregoing user equipment or network device.

In the embodiments of the present invention, user equipment acquires a status of using a target unlicensed frequency band by a target radio access technology RAT, and selects a different measurement mode according to the usage status to measure a radio condition of the target unlicensed frequency band, so that the user equipment can accurately measure the radio condition of the target unlicensed frequency band, so as to provide reference information for a network device to schedule the user equipment.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
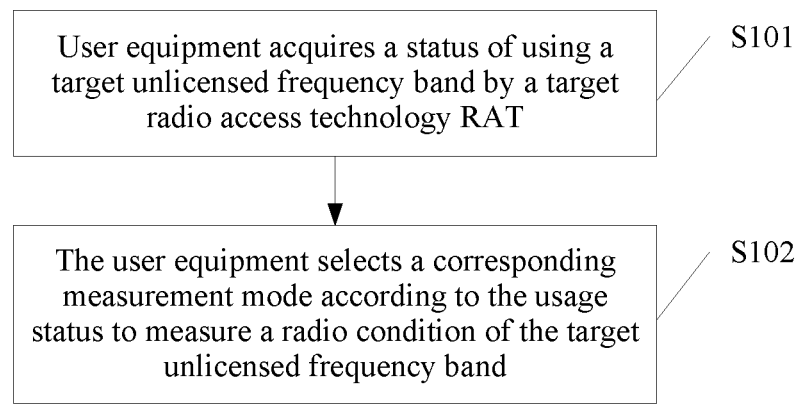
FIG. 1 is a schematic flowchart of a measurement method according to a first embodiment of the present invention.

Referring to FIG. 1, FIG. 1 is a schematic flowchart of a measurement method according to a first embodiment of the present invention. In this embodiment, the method includes the following steps:

S101. User equipment acquires a status of using a target unlicensed frequency band by a target radio access technology RAT.

Specifically, the user equipment supports at least one radio access technology (RAT). For example, radio access technologies RATs include any 2G 3G 4G or higher generation communications technology such as a Long Term Evolution (LTE) radio access technology, a Universal Mobile Telecommunications System (UMTS) radio access technology, Global System for Mobile Communications (GSM) radio access, or Code Division Multiple Access 2000 (CDMA2000) radio access, and different variations thereof, and any other radio access technologies that are set to interact with such mobile communications technology.

The radio access technology may include a WLAN radio access technology, for example, a radio access technology of protocols in the IEEE 802.11 family and a Bluetooth radio access technology; or may include a WiMax radio access technology, for example, a radio access technology of protocols in the IEEE 802.16 family.

The target radio access technology RAT refers to a radio access technology that currently uses the target unlicensed frequency band. An unlicensed frequency band refers to a frequency band that is not allocated by a spectrum management authority to a designated radio access technology and that can be used by multiple radio access technologies. Because the multiple radio access technologies can share the unlicensed frequency band, before using the unlicensed frequency band, any radio access technology needs to first probe whether another radio access technology occupies the unlicensed frequency band, and the unlicensed frequency band can be used for communication only when the unlicensed frequency band is in an idle state. The target unlicensed frequency band is a part of or the entire unlicensed frequency band, and may include multiple frequency ranges. Different frequency ranges may be indicated by using channel numbers. A method for probing the usage status of the unlicensed frequency band may be a method such as probing by the user equipment, probing by a network device, probing in collaboration, which is not limited in the present invention. The user equipment acquires the status of using the target unlicensed frequency band by the target radio access technology RAT, and the usage status is classified into two types, where a first type of usage status is that the target RAT already occupies the target unlicensed frequency band, and a second type of usage status is that the target RAT does not occupy the target unlicensed frequency band. When the target RAT already occupies the target unlicensed frequency band, a network device of the target RAT sends characteristic information of the target RAT, for example, a downlink synchronization signal, a downlink reference signal, a downlink pilot signal, a downlink beacon, or downlink system information on the unlicensed frequency band. User equipment that supports the target RAT detects the foregoing signal on the target unlicensed frequency band. For example, when the target RAT is LTE, an LTE base station sends a primary synchronization signal (PSS) and a secondary synchronization signal (SSS), a cell-specific reference signal (CRS), a channel state information-reference signal (CSI-RS), and/or a demodulation reference signal (DMRS). If the target RAT does not occupy the target unlicensed frequency band, a network device of the target RAT does not send a synchronization signal, a reference signal, or system information on the unlicensed frequency band, and the user equipment cannot detect the foregoing signal either.

S102. The user equipment selects a corresponding measurement mode according to the usage status of the target unlicensed frequency band to measure a radio condition of the target unlicensed frequency band.

Specifically, a mapping table of a mapping relationship between a measurement mode and a usage status is preconfigured for the user equipment, and in the mapping table, each type of usage status is associated with at least one measurement mode. The user equipment queries the mapping table for the corresponding measurement mode according to the status of using the target unlicensed frequency band by the target RAT, where the status is acquired in S101, and measures the radio condition of the target unlicensed frequency band.

A first measurement mode for measuring the radio condition of the target unlicensed frequency band is based on the characteristic information of the target RAT. For example, when the target RAT is an LTE system, measurement performed by the user equipment based on a reference signal such as a CRS, a CSI-RS, and/or a DMRS of LTE may include radio resource management (RRM) measurement and channel state information (CSI) measurement. The RRM measurement may be measurement performed based on reference signal received power (RSRP) and reference signal received quality (RSRQ) of the CRS, the CSI-RS, and/or the DMRS. The CSI measurement includes a channel quality indicator (CQI), a precoding matrix indication (PMI), a rank indication (RI), and the like.

A second measurement mode for measuring the radio condition of the target unlicensed frequency band is related measurement or detection that is based on physical measurement, spectrum analysis, spectrum sensing, or the like for the target unlicensed frequency band, for example, measurement such as physical layer energy detection (energy sensing or energy detection), covariance matrix detection, matched filtering detection, cyclostationary feature detection, eigenvalue-based spectrum sensing, a received signal strength indicator (RSSI), interference measurement, a signal-to-noise ratioSNR, a signal to interference plus noise ratio (SINR), and rise over thermal (ROT).

In this embodiment of the present invention, user equipment acquires a status of using a target unlicensed frequency band by a target radio access technology RAT, and selects a different measurement mode according to the usage status to measure a radio condition of the target unlicensed frequency band, so that the user equipment can accurately measure the radio condition of the unlicensed frequency band, so as to provide reference information for a network device to schedule the user equipment.

Figure 2:
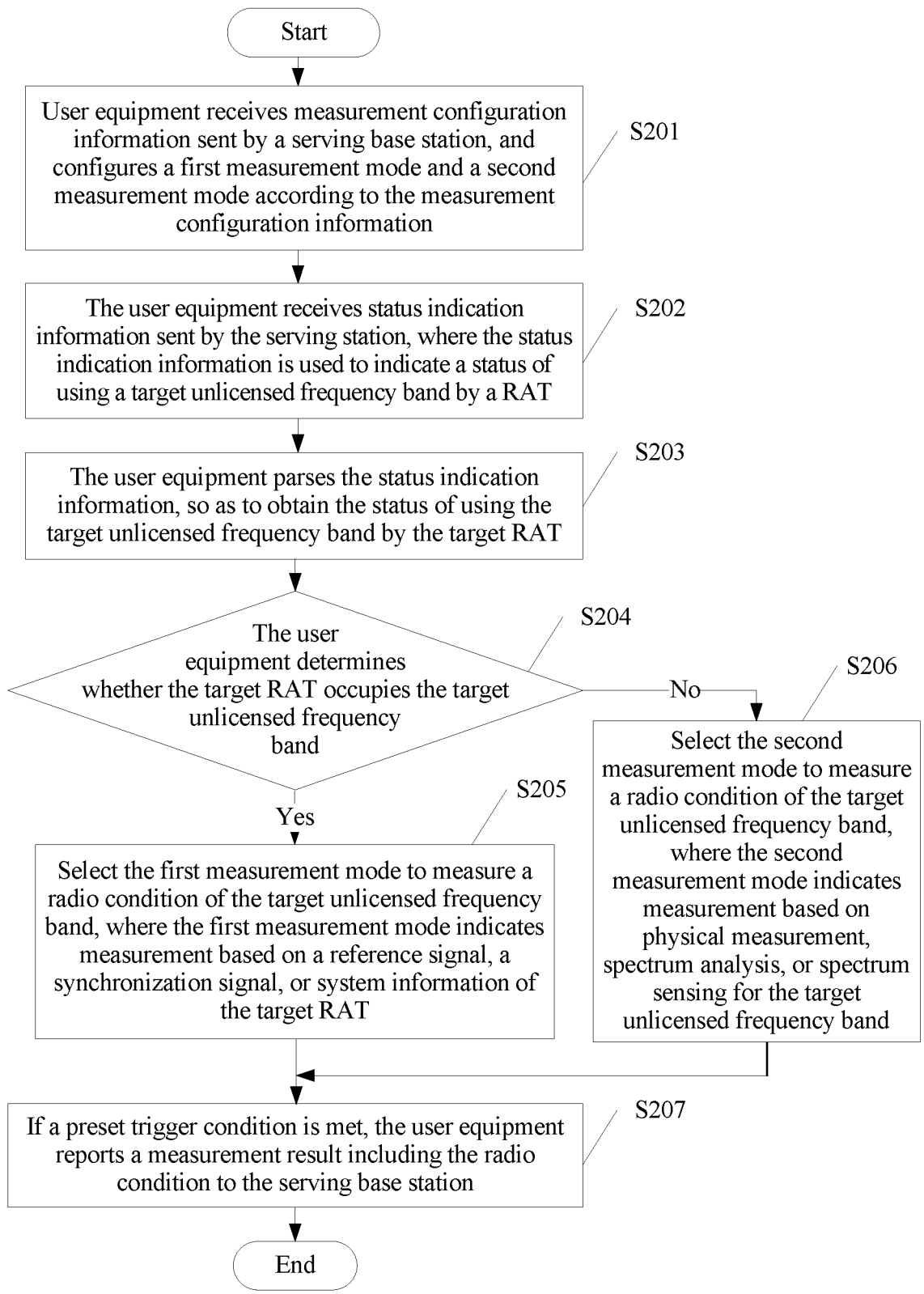
FIG. 2 is a schematic flowchart of a measurement method according to a second embodiment of the present invention.

Referring to FIG. 2, FIG. 2 is a schematic flowchart of a measurement method according to a second embodiment of the present invention. In this embodiment, a target radio access technology RAT is a cellular radio access technology RAT, and the method includes the following steps:

S201. User equipment receives measurement configuration information sent by a serving base station, and configures a first measurement mode and a second measurement mode according to the measurement configuration information.

Specifically, the serving base station sends the measurement configuration information to the user equipment in a serving cell, where the measurement configuration information may be carried in a radio resource control connection reconfiguration message, and the measurement configuration information includes a mapping relationship between a measurement mode and a usage status of a target unlicensed frequency band. The mapping relationship is specifically: a state indicating that the target RAT already occupies the target unlicensed frequency band is corresponding to the first measurement mode; and a state indicating that the target RAT does not occupy the target unlicensed frequency band is corresponding to the second measurement mode. The first measurement mode indicates that the user equipment measures based on a synchronization signal, a reference signal, or system information, and the second measurement mode indicates that the user equipment measures based on a method such as physical measurement, spectrum analysis, or spectrum sensing for the target unlicensed frequency band. The user equipment receives the measurement configuration information sent by the serving base station, and configures the first measurement mode and the second measurement mode according to an instruction of the measurement configuration information. After completing a configuration operation, the user equipment sends a configuration complete message to the serving base station.

S202. The user equipment receives a status indication message sent by the serving base station, where the status indication message is used to indicate a status of using the target unlicensed frequency band by the target RAT.

Specifically, the serving base station probes, by using a spectrum sensing algorithm, the status of using the target unlicensed frequency band by the target RAT. The serving base station loads the detected usage status of the target unlicensed frequency band to the status indication message, and sends the status indication message to the user equipment. For example, the serving base station may use a bitmap manner to indicate the status of using the target unlicensed frequency band by the target RAT, where "1" indicates that the target RAT already occupies the target unlicensed frequency band, and "0" indicates that the target RAT does not occupy the target unlicensed frequency band. Alternatively, the usage status is indicated in another manner, which is not limited in the present invention.

If the target RAT already occupies the target unlicensed frequency band, the serving base station sends a downlink synchronization signal, a downlink reference signal, or downlink system information on the target unlicensed frequency band; or if the target RAT does not occupy the target unlicensed frequency band (the target RAT has released the target unlicensed frequency band or another RAT occupies the target unlicensed frequency band), the serving base station stops sending the downlink synchronization signal, the downlink reference signal, or the downlink system information.

S203. The user equipment parses the status indication message, so as to obtain the status of using the target unlicensed frequency band by the target RAT.

Specifically, the user equipment receives the status indication message sent by the serving base station, and by parsing the status indication message, obtains the status of using the target unlicensed frequency band by the target RAT.

Optionally, the user equipment may also detect, by itself, the status of using the target unlicensed frequency band by the target RAT, that is, the user equipment probes, by using the spectrum sensing algorithm, the status of using the target unlicensed frequency band by the target RAT. Specifically, the target RAT preconfigures a radio frame pattern for the user equipment and the serving base station. For example, when the target RAT is an LTE radio access technology, a radio frame pattern with a length of 10 bits is preconfigured for the user equipment and the serving base station in LTE. It is assumed that the radio frame pattern is based on a length of one radio frame, and the pattern is designed as "1111111110", where a value "1" indicates that a corresponding subframe may be occupied by LTE, and a value "0" indicates that a corresponding subframe may be not occupied by LTE. At a subframe "1" of the radio frame pattern, the user equipment starts to probe a status of using the target unlicensed frequency band by LTE. After an LTE reference signal is detected, it indicates that LTE already occupies the target unlicensed frequency band indeed, and the user equipment learns that LTE no longer occupies the target unlicensed frequency band at a subframe "0". At a subframe "1", the serving base station probes the usage status of the target unlicensed frequency band according to the same radio frame pattern. If another RAT does not occupy the target unlicensed frequency band, the serving base station sends a downlink synchronization signal, a downlink reference signal, or downlink system information, and at a subframe "0", stops sending the downlink synchronization signal, the downlink reference signal, or the downlink system information. It may be understood that a length of the configured radio frame pattern is not limited in the present invention, and for example, the radio frame pattern may be designed based on two or more radio frames.

S204. The user equipment determines whether the target RAT occupies the target unlicensed frequency band.

Specifically, the user equipment determines, according to the usage status acquired in S203, whether the target RAT occupies the target unlicensed frequency band, and if yes, S205 is performed, or if no, S206 is performed.

S205. Select the first measurement mode to measure a radio condition of the target unlicensed frequency band, where the first measurement mode indicates measurement performed based on a reference signal, a synchronization signal, or system information of the target RAT.

Specifically, the target RAT is the cellular radio access technology, and when the target RAT already occupies the target unlicensed frequency band, the user equipment selects the first measurement mode to measure a radio condition of the target unlicensed frequency band on which the serving cell is carried. When the target RAT already occupies the target unlicensed frequency band in a neighboring cell, and the user equipment selects the first measurement mode to measure a radio condition of the target unlicensed frequency band on which the neighboring cell is carried.

When measuring the radio condition of the target unlicensed frequency band on which the serving cell is carried, the user equipment receives a downlink synchronization signal, a downlink reference signal, or downlink system information sent by the serving base station in the serving cell, and measures according to the foregoing received signal.

When measuring an intra-frequency neighboring cell, the user equipment cannot directly acquire a status of using the target unlicensed frequency band by the target RAT in the neighboring cell. A method for acquiring the status of using the target unlicensed frequency band by the target RAT in the neighboring cell may be as follows: A neighboring base station probes the status of using the unlicensed frequency band by the target RAT, and transmits the usage status to the serving base station through a communications interface (for example, an X2 interface), and the user equipment acquires the usage status by using the serving base station of the user equipment. The user equipment selects a corresponding measurement mode according to the acquired usage status of the unlicensed frequency band in the neighboring cell to measure the radio condition of the target unlicensed frequency band on which the neighboring cell is carried. Specifically, if the target RAT already obtains the target unlicensed frequency band in the neighboring cell, the user equipment uses the first measurement mode to measure the radio condition of the target unlicensed frequency band in the neighboring cell; or if the target RAT does not obtain the target unlicensed frequency band in the neighboring cell, the user equipment uses the second measurement mode to measure the radio condition of the target unlicensed frequency band on which the neighboring cell is carried. Preferably, the neighboring base station may announce, over a CPC channel, information about the usage status of the unlicensed frequency band in the neighboring cell, and the user equipment reads the CPC channel, so as to obtain the status of using the target unlicensed frequency band by the target RAT in the neighboring cell. Preferably, the serving base station and the neighboring base station may negotiate with communications nodes of other RATs within a coverage area about occasions for obtaining and releasing the target unlicensed frequency band, so that the multiple communications nodes can use the target unlicensed frequency band for communication in an orderly manner, thereby avoiding mutual interference. For example, when there are two communications nodes in a current environment, radio frames are respectively configured for the foregoing communications nodes, where the radio frame includes a time period 1 and a time period 2. A first communications node occupies the target unlicensed frequency band during the time period 1, and a second communications node occupies the target unlicensed frequency band during the time period 2, so that when measuring the serving cell and/or the neighboring cell, same user equipment switches between the first measurement mode and the second measurement mode in a unanimous manner.

Figure 3:
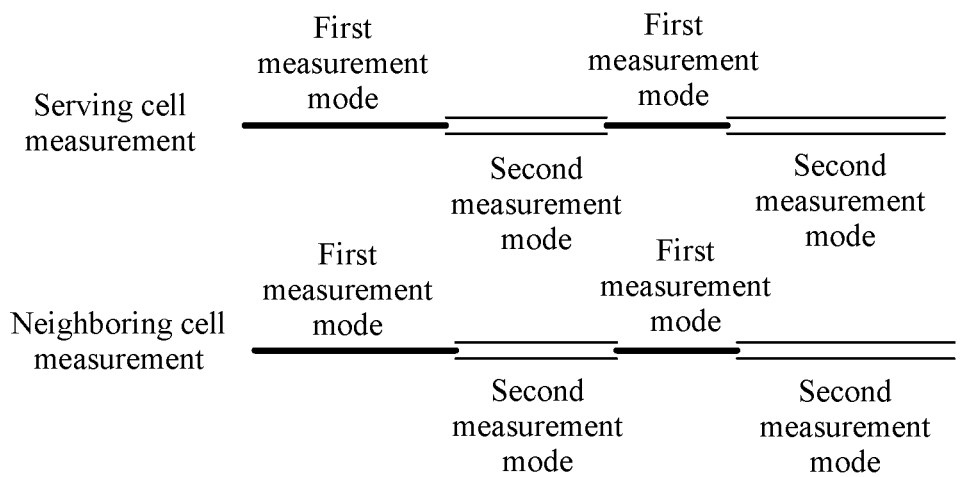
FIG. 3 is a schematic structural diagram of user equipment according to a first embodiment of the present invention.

It may be understood that referring to FIG. 3, if occasions for obtaining and releasing an LTE spectrum by the serving base station and the neighboring base station are different, and the user equipment configures the first measurement mode and the second measurement mode in both the serving cell and the neighboring cell, the user equipment may need to perform measurement in the first measurement mode and measurement in the second measurement mode at the same time during a time period, which therefore may cause relatively high overheads and processing complexity to measurement of the UE. To reduce overheads and processing complexity, the first measurement mode and the second measurement mode for the serving cell may be configured for the same user equipment, while only the first measurement mode is configured for the intra-frequency neighboring cell; or the first measurement mode is configured for the serving cell, while the first measurement mode and the second measurement mode are configured for the intra-frequency neighboring cell. Alternatively, the first measurement mode and the second measurement mode for the serving cell and the first measurement mode and the second measurement mode for the intra-frequency neighboring cell are respectively configured for different user equipments. For example, the first measurement mode and the second measurement mode only for the serving cell are configured for UE1, and the first measurement mode and the second measurement mode only for the neighboring cell are configured for UE2. Optionally, the base station selects UEs that are in similar radio environments and/or are close in geographic position to complete the foregoing measurement in collaboration. It should be noted that when the user equipment needs to measure, in the second measurement mode, the unlicensed frequency band on which the serving cell is carried and the unlicensed frequency band on which the intra-frequency neighboring cell is carried, actually, the user equipment performs same measurement, that is, the measurement performed in the second measurement mode based on the physical measurement, the spectrum analysis, or the spectrum sensing for the unlicensed frequency band, and the user equipment does not distinguish between measurement for the serving cell and measurement for the neighboring cell. When the user equipment measures for the intra-frequency neighboring cell in the first measurement mode, the user equipment measures based on a reference signal of the intra-frequency neighboring cell. However, a characteristic of the reference signal of the intra-frequency neighboring cell, for example, a sequence or a symbol location of the reference signal, is different from a characteristic of a reference signal of the serving cell, and the user equipment may distinguish between the measurement for the serving cell and the measurement for the neighboring cell.

It may be understood that the serving base station may also configure that the user equipment measures on an inter-frequency of the target unlicensed frequency band in the first measurement mode and the second measurement mode. The inter-frequency also belongs to the unlicensed frequency band, and is not yet used by the serving base station as an operating frequency band for the time being, but is used as a potential candidate frequency and may be subsequently configured for the user equipment as a new serving cell. The inter-frequency may also be used by the neighboring base station as an operating frequency band. The serving base station may probe by itself or receive a notification message from the neighboring base station, so as to learn whether the target RAT occupies the inter-frequency unlicensed frequency band, and notify the user equipment, so that the user equipment measures on the inter-frequency unlicensed frequency band of the serving cell in the first measurement mode or the second measurement mode. The serving base station may configure that the user equipment starts to measure the inter-frequency unlicensed frequency band of the target unlicensed frequency band only when the radio condition of the target unlicensed frequency band is lower than a preset threshold. The serving base station may determine, according to a radio condition of the inter-frequency unlicensed frequency band, whether to configure the inter-frequency unlicensed frequency band for the UE as a new serving cell. The serving base station may determine, according to a comparison between the radio condition of the target unlicensed frequency band and/or the radio condition of the inter-frequency unlicensed frequency band, whether to delete the serving cell on the target unlicensed frequency band and newly configure a serving cell on the inter-frequency unlicensed frequency band.

Optionally, in a 3GPP small cell enhancement (SCE) scenario, carrier aggregation may be performed between base stations. A master eNodeB (MeNB) provides a PCell and zero or more SCells, and a secondary eNodeB (SeNB) provides one or more SCells. If an uplink is configured for the SeNB, a PUCCH needs to be configured for at least one SCell of the SeNB, where the SCell is a primary serving cell of the SeNB. The MeNB and the SeNB communicate with each other by extending the X2 interface in the prior art, and generally, there may be a communication delay of more than 5 ms, for example, a 20 ms one-way delay.

The SeNB may configure the first measurement mode and the second measurement mode in the SeNB for the UE by using the unlicensed frequency band. The SeNB may instruct the UE to switch between the first measurement mode and the second measurement mode; or configure a radio frame pattern for the UE, so that the UE automatically detects and determines to use the first measurement mode or the second measurement mode. The UE reports a measurement result to the MeNB by using a measurement report, so that the MeNB manages the SeNB, for example, determines to add a new SeNB and/or delete an old SeNB. Alternatively, the UE may report the measurement result to the SeNB, so that the SeNB makes a scheduling decision, for example, adjusts an MCS for scheduling the UE. Alternatively, after the UE reports the measurement result to the MeNB, the MeNB forwards the measurement result to the SeNB through the X2 interface, so that the SeNB makes a scheduling decision. Alternatively, the MeNB, the SeNB, or the UE sends the measurement result and/or decision information over the CPC channel, and the MeNB/SeNB/UE may learn information such as a spectrum status and a radio condition by reading information on the CPC channel.

S206. Select the second measurement mode to measure a radio condition of the target unlicensed frequency band, where the second measurement mode indicates measurement performed based on spectrum analysis for the target unlicensed frequency band.

Specifically, the target RAT does not occupy the target unlicensed frequency band, the user equipment cannot detect, in the serving cell or the neighboring cell, the synchronization signal, the reference signal, or the system information sent by the target RAT, and the user equipment measures the radio condition of the target unlicensed frequency band in the second measurement mode.

S207. If a preset trigger condition is met, the user equipment reports a measurement result including the radio condition to the serving base station.

Specifically, the measurement configuration information further includes the trigger condition, where the trigger condition is triggering periodically and/or triggering by an event. When determining that the preset trigger condition is met, the user equipment reports the radio condition obtained by means of measurement in the first measurement mode or the second measurement to the serving base station.

Optionally, the measurement configuration information further includes one or more of frequency information, a measurement parameter, a RAT type, a RAT index, and operator code.

Preferably, the user equipment performs filtering or averaging processing on radio conditions obtained by means of multiple times of measurement in the first measurement mode or the second measurement mode, and reports the radio condition obtained after the filtering or averaging processing to the serving base station. For example, when the target RAT is the LTE system, for RRM measurement in the first measurement mode, a Layer 3 filtering manner defined in a 3GPP protocol TS 36.331 is as follows:

$$F_n = (1-a) \cdot F_{n-1} + a \cdot M_n$$

The foregoing formula is used for Layer 3 filtering or averaging before the user equipment evaluates whether the measurement result meets the trigger condition of reporting. Mn is a latest physical layer measurement result, and Fn is a measurement result obtained after the filtering or averaging. Fn−1 is a measurement result obtained after a previous time of filtering or averaging. F0 is set to M1, and is the first physical layer measurement result. $a=\frac{1}{2}^{(k/4)}$, where k is a filtering coefficient, and a value of k varies with different sampling rates. With reference to this embodiment, for example, during LTE intra-frequency measurement, it is required that the foregoing Layer 3 filtering or averaging is performed once every 200 ms, but during the 200 ms, a measurement sample of the first measurement mode and a measurement sample of the measurement mode 2 are included. When the foregoing formula is used to calculate the measurement result to evaluate whether a reporting criterion is met, only the measurement sample of the first measurement mode is evaluated and the measurement sample of the second measurement mode is ignored.

Optionally, a user in RRC IDLE state may also perform the foregoing measurement and measurement reporting. A base station sends, in a cell corresponding to a licensed spectrum of the base station, measurement configuration information of the first measurement mode and/or the second measurement mode on an unlicensed spectrum by using system information broadcast (SIB). The UE in RRC IDLE state that camps on the unlicensed spectrum reads the foregoing system information related to the measurement configuration and measures the unlicensed spectrum. When a measurement result of the first measurement mode and/or the second measurement mode is higher than a preconfigured threshold, the UE may trigger a random access process to connect to a cell and enter RRC CONNECTED state, and report the measurement result to the base station, so that the base station determines, according to a measurement report, that the UE can be scheduled on the unlicensed spectrum.

Optionally, in RRC IDLE state, the UE may perform measurement according to the measurement configuration of the first measurement mode and/or the measurement mode, and record the measurement result by using a log periodically or when the measurement result is higher or lower than the preconfigured threshold, for example, record a radio condition and/or interference information, and corresponding geographical position information on the unlicensed spectrum. When entering RRC CONNECTED state, the UE may directly send the foregoing log including the measurement result to the base station, or after receiving indication information from the base station, send the foregoing log to the base station. The method may be applied to a measurement and reporting process related to Minimization of Drive Tests (MDT), so that an operator collects a measurement map of a usage status of the unlicensed spectrum or the like more conveniently.

The serving base station determines a situation of an intra-system radio condition and/or interference or inter-system interference at a cell edge according to the measurement result, reported by the user equipment, of the first measurement mode or the second measurement mode for the intra-frequency neighboring cell, and performs corresponding processing for user equipment handover, serving cell power control, and interference coordination or coordinated multipoint transmission when the serving cell and the intra-frequency neighboring base station use LTE. For example, when the intra-frequency neighboring cell operates in LTE mode, when a radio condition such as RSRP of the serving cell is lower than a radio condition such as RSRP of the intra-frequency neighboring cell by a specific threshold, the serving base station instructs the UE to be handed over to the intra-frequency neighboring cell. For another example, when the serving cell can operate in LTE mode with the intra-frequency neighboring cell, the serving cell and the intra-frequency neighboring cell operate in a time-division mode, so as to avoid interference to cell-edge UE. For example, the serving cell may set an almost blank subframe (ABS) and notify the neighboring cell of configuration information of the almost blank subframe, so that the neighboring cell can schedule the cell-edge UE in the ABS subframe, so as to avoid interference. In this case, the serving cell and the neighboring cell may also schedule the cell-edge UE in a coordinated multipoint transmission (CoMP) manner in a mode such as joint transmission (JT) or dynamic point selection (DPS). For still another example, when the serving cell operates in LTE mode, and a spectrum resource of the neighboring cell is occupied by an inter-system, the serving cell may determine, according to a measurement result, reported by the UE, of inter-system interference of the neighboring cell, whether to schedule the cell-edge UE or whether to adjust a modulation and coding scheme (MCS).

In this embodiment of the present invention, user equipment acquires a status of using a target unlicensed frequency band by a target radio access technology RAT, and selects a different measurement mode according to the usage status to measure a radio condition of the target unlicensed frequency band, so that the user equipment can accurately measure the radio condition of the unlicensed frequency band, so as to provide reference information for a network device to schedule the user equipment.

Figure 4:
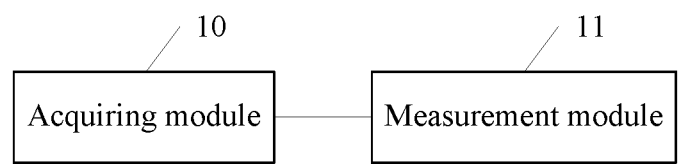
FIG. 4 is a schematic structural diagram of user equipment according to a second embodiment of the present invention.

Referring to FIG. 3, FIG. 4 is a schematic structural diagram of user equipment according to a first embodiment of the present invention. In this embodiment, the user equipment includes: an acquiring module 10 and a measurement module 11.

The acquiring module 10 is configured to acquire a status of using a target unlicensed frequency band by a target radio access technology RAT.

Specifically, the user equipment supports at least one radio access technology (RAT). For example, radio access technologies RATs include any 2G 3G 4G or higher generation communications technology such as an LTE radio access technology, a UMTS radio access technology, GSM radio access, or CDMA2000 radio access, and different variations thereof, and any other radio access technologies that are set to interact with such mobile communications technology.

The radio access technology may include a WLAN radio access technology, for example, a radio access technology of protocols in the IEEE 802.11 family and a Bluetooth radio access technology; and may include a WiMax radio access technology, for example, a radio access technology of protocols in the IEEE 802.16 family.

The target radio access technology RAT refers to a radio access technology that currently uses the target unlicensed frequency band. An unlicensed frequency band refers to a frequency band that is not allocated by a spectrum management authority to a designated radio access technology and that can be used by multiple radio access technologies, which may include radio access technologies of a same priority or radio access technologies of different priorities. Because the multiple radio access technologies can share the unlicensed frequency band, before using the unlicensed frequency band, any lower-priority radio access technology needs to first probe whether another radio access technology occupies the unlicensed frequency band, and the unlicensed frequency band can be used for communication only when the unlicensed frequency band is in an idle state. During the lower-priority radio access technology uses the unlicensed frequency band, a higher-priority radio access technology can also seize the unlicensed frequency band, and a highest-priority radio access technology can directly use the unlicensed frequency band. The target unlicensed frequency band is a part of or the entire unlicensed frequency band, and may include multiple frequency ranges. Different frequency ranges may be indicated by using channel numbers. A method for probing the usage status of the unlicensed frequency band may be: probing by the user equipment, probing by a network device, probing in collaboration, which is not limited in the present invention. The user equipment acquires the status of using the target unlicensed frequency band by the target radio access technology RAT, and the usage status is classified into two types, where a first type of usage status is that the target RAT already occupies the target unlicensed frequency band, and a second type of usage status is that the target RAT does not occupy the target unlicensed frequency band. When the target RAT already occupies the target unlicensed frequency band, a network device of the target RAT sends characteristic information of the target RAT, for example, a downlink synchronization signal, a downlink reference signal, a downlink pilot signal, a downlink beacon, or downlink system information on the unlicensed frequency band, and user equipment that supports the target RAT detects the foregoing signal on the target unlicensed frequency band. For example, when the target RAT is LTE, an LTE base station sends a primary synchronization signal (PSS) and a secondary synchronization signal (SSS), a cell-specific reference signal (CRS), a channel state information-reference signal (CSI-RS), and/or a demodulation reference signal (DMRS). If the target RAT does not occupy the target unlicensed frequency band, a network device of the target RAT does not send a synchronization signal, a reference signal, or system information on the unlicensed frequency band, and the user equipment cannot detect the foregoing signal either.

The measurement module 11 is configured to select a corresponding measurement mode according to the usage status to measure a radio condition of the target unlicensed frequency band.

Specifically, a mapping table of a mapping relationship between a measurement mode and a usage status is preconfigured for the user equipment, and in the mapping table, each type of usage status is associated with at least one measurement mode. The user equipment queries the mapping table for the corresponding measurement mode according to the status that is of using the target unlicensed frequency band by the target RAT and is acquired in S101, and measures the radio condition of the target unlicensed frequency band.

A first measurement mode for measuring the radio condition of the target unlicensed frequency band is based on the characteristic information of the target RAT. For example, when the target RAT is an LTE system, measurement performed by the user equipment based on a reference signal such as a CRS, a CSI-RS, and/or a DMRS of LTE may include radio resource management (RRM) measurement and channel state information (CSI) measurement. The RRM measurement may be measurement performed based on reference signal received power (RSRP) and reference signal received quality (RSRQ) of the CRS, the CSI-RS, and/or the DMRS. The CSI measurement includes a channel quality indicator (CQI), a precoding matrix indication (PMI), a rank indication (RI), and the like.

A second measurement mode for measuring the radio condition of the target unlicensed frequency band is related measurement or detection that is based on physical measurement, spectrum analysis, or spectrum sensing for the target unlicensed frequency band, for example, measurement such as physical layer energy detection, covariance matrix detection, matched filtering detection, cyclostationary feature detection, eigenvalue-based spectrum sensing, a received signal strength indicator (, RSSI), interference measurement, a signal-to-noise ratio (SNR), a signal to interference plus noise ratio (SINR), and rise over thermal (ROT).

Figure 5:
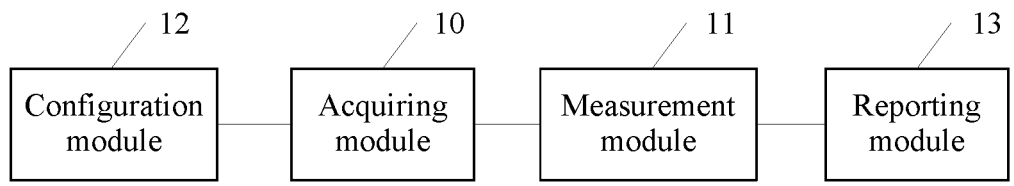
FIG. 5 is a schematic structural diagram of an acquiring module in FIG. 4.
Figure 6:
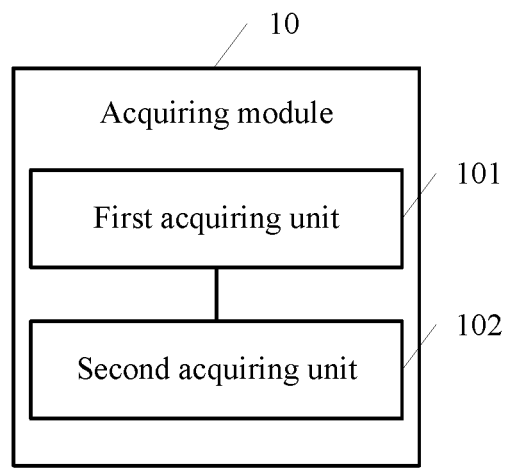
FIG. 6 is a schematic structural diagram of a measurement module in FIG. 4.

Referring to FIG. 4, FIG. 5 is a schematic structural diagram of user equipment according to a second embodiment of the present invention. In this embodiment, in addition to including the acquiring module 10 and the measurement module 11, the user equipment further includes a configuration module 12 and a reporting module 13.

The configuration module 12 is configured to receive measurement configuration information sent by the serving base station, and configure the first measurement mode and the second measurement mode according to the measurement configuration information.

The reporting module 13 is configured to: if a preset trigger condition is met, report a measurement result including the radio condition to the serving base station.

Further, the acquiring module 10 includes a first acquiring unit 101 and/or a second acquiring unit 102.

The first acquiring unit 101 is configured to receive status indication information sent by the serving base station, where the status indication information is used to indicate the status of using the target unlicensed frequency band by the target RAT; and parse the status indication information, so as to obtain the status of using the target unlicensed frequency band by the target RAT.

The second acquiring unit 102 is configured to specify a subframe in a preset radio frame, so as to detect the status of using the unlicensed frequency band by the target RAT.

Further, the measurement module 11 includes a first measurement unit 111 and a second measurement unit 112.

The first measurement unit 111 is configured to: if it is determined that the target RAT already occupies the target unlicensed frequency band, select the first measurement mode to measure the radio condition of the target unlicensed frequency band, where the first measurement mode indicates measurement performed based on a reference signal, a synchronization signal, or system information of the target RAT.

The second measurement unit 112 is configured to: if it is determined that the target RAT does not occupy the target unlicensed frequency band, select the second measurement mode to measure the radio condition of the target unlicensed frequency band, where the second measurement mode indicates measurement performed based on physical measurement, spectrum analysis, or spectrum sensing for the target unlicensed frequency band.

Preferably, the first measurement unit 111 is configured to:

select the first measurement mode to measure the radio condition of the target unlicensed frequency band of a serving cell and/or a neighboring cell, where frequencies of the serving cell and the neighboring cell are the target unlicensed frequency band.

Preferably, the reporting module 13 is configured to perform filtering or averaging processing on radio conditions obtained by means of multiple times of measurement in the first measurement mode or the second measurement mode, and report the radio condition obtained after the filtering or averaging processing to the serving base station.

This embodiment and the second method embodiment are based on a same conception, and technical effects brought by this embodiment of the present invention and the second method embodiment are also the same. For details, refer to the descriptions of the second method embodiment, and details are not described herein again.

Figure 7:
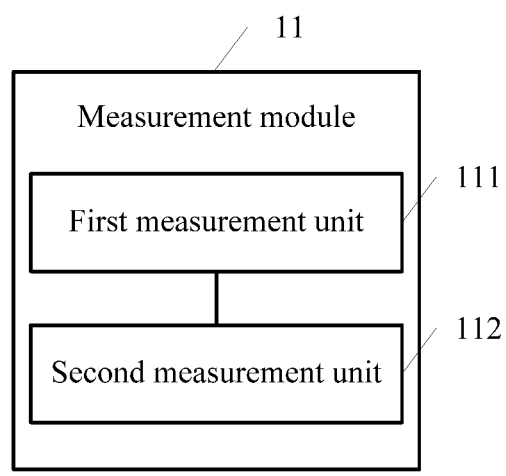
FIG. 7 is a schematic structural diagram of user equipment according to a third embodiment of the present invention.
Figures 8, 9:
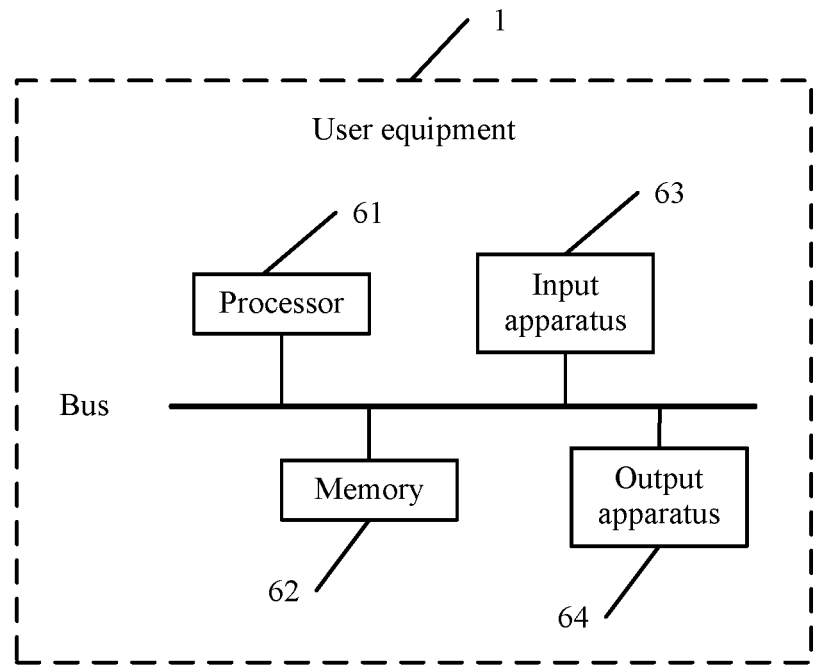
FIG. 8 is a schematic flowchart of a measurement configuration method according to a first embodiment of the present invention.
FIG. 9 is a schematic flowchart of a measurement configuration method according to a second embodiment of the present invention.

Referring to FIG. 5, FIG. 8 is another schematic structural diagram of user equipment according to an embodiment of the present invention. The user equipment includes a processor 61, a memory 62, an input apparatus 63, and an output apparatus 64, where the user equipment may include one or more processors 61, and one processor is used as an example in FIG. 5. In some embodiments of the present invention, the processor 61, the memory 62, the input apparatus 63, and the output apparatus 64 may be connected by using a bus or in another manner, and a connection by using a bus is used as an example in FIG. 7.

The memory 62 stores a set of program code, and the processor 61 is configured to invoke the program code stored in the memory 62 to perform the following operations:

acquiring a status of using a target unlicensed frequency band by a target radio access technology RAT; and selecting a corresponding measurement mode according to the usage status to measure a radio condition of the target unlicensed frequency band.

Further, that the processor 61 performs the step of selecting a corresponding measurement mode according to the usage status to measure a radio condition of the target unlicensed frequency band includes:

if it is determined that the target RAT already occupies the target unlicensed frequency band, selecting a first measurement mode to measure the radio condition of the target unlicensed frequency band, where the first measurement mode indicates measurement performed based on a reference signal, a synchronization signal, or system information of the target RAT; or if it is determined that the target RAT does not occupy the target unlicensed frequency band, selecting a second measurement mode to measure the radio condition of the target unlicensed frequency band, where the second measurement mode indicates measurement performed based on physical measurement, spectrum analysis, or spectrum sensing for the target unlicensed frequency band.

Further, the target RAT is a cellular radio access technology, and that the processor 61 performs the step of selecting a first measurement mode to measure the radio condition of the target unlicensed frequency band includes:

selecting the first measurement mode to measure the radio condition of the target unlicensed frequency band of a serving cell and/or a neighboring cell, where frequencies of the serving cell and the neighboring cell are the target unlicensed frequency band.

Further, that the processor 61 performs the step of acquiring a status of using a target unlicensed frequency band by a target RAT includes:

receiving status indication information sent by a serving base station, where the status indication information is used to indicate the status of using the target unlicensed frequency band by the target RAT; and parsing the status indication information, so as to obtain the status of using the target unlicensed frequency band by the target RAT; or specifying a subframe in a preset radio frame, so as to detect the status of using the unlicensed frequency band by the target RAT.

Further, the processor 61 is further configured to perform:

if a preset trigger condition is met, reporting a measurement result including the radio condition to the serving base station.

Further, the serving base station is a secondary eNodeB SeNB, and that the processor 61 performs the step of reporting a measurement result including the radio condition to the serving base station includes:

reporting, by the user equipment, the measurement result including the radio condition to the SeNB, so that the SeNB reports the measurement result to a master eNodeB MeNB to which the SeNB belongs.

Further, that the processor 61 performs the step of reporting a measurement result including the radio condition to the serving base station includes:

performing filtering or averaging processing on radio conditions obtained by means of multiple times of measurement in the first measurement mode or the second measurement mode, and reporting the radio condition obtained after the filtering or averaging processing to the serving base station.

Referring to FIG. 9, FIG. 9 is a schematic flowchart of a measurement configuration method according to a first embodiment of the present invention. In this embodiment, the method includes the following step:

S301. A network device sends measurement configuration information to user equipment, where the measurement configuration information is used to instruct the user equipment to configure a first measurement mode and a second measurement mode.

Specifically, the network device sends the measurement configuration information to user equipment within a coverage area, and the measurement configuration information may be carried in a radio resource control connection reconfiguration message. The measurement configuration information includes a mapping relationship between a measurement mode and a usage status of a target unlicensed frequency band. The mapping relationship is specifically: a state indicating that the target RAT already occupies the target unlicensed frequency band is corresponding to the first measurement mode; and a state indicating that the target RAT does not occupy the target unlicensed frequency band is corresponding to the second measurement mode. The first measurement mode indicates that the user equipment measures based on a synchronization signal, a reference signal, or system information, and the second measurement mode indicates that the user equipment measures performed based on physical measurement, spectrum analysis, or spectrum sensing for the target unlicensed frequency band. The user equipment receives the measurement configuration information sent by a serving base station, and configures the first measurement mode and the second measurement mode according to an instruction of the measurement configuration information. After completing a configuration operation, the user equipment sends a configuration complete message to the network device.

The measurement configuration information further includes one or more types of frequency information, a measurement parameter, a RAT type, a RAT index, and operator code.

Figure 10:
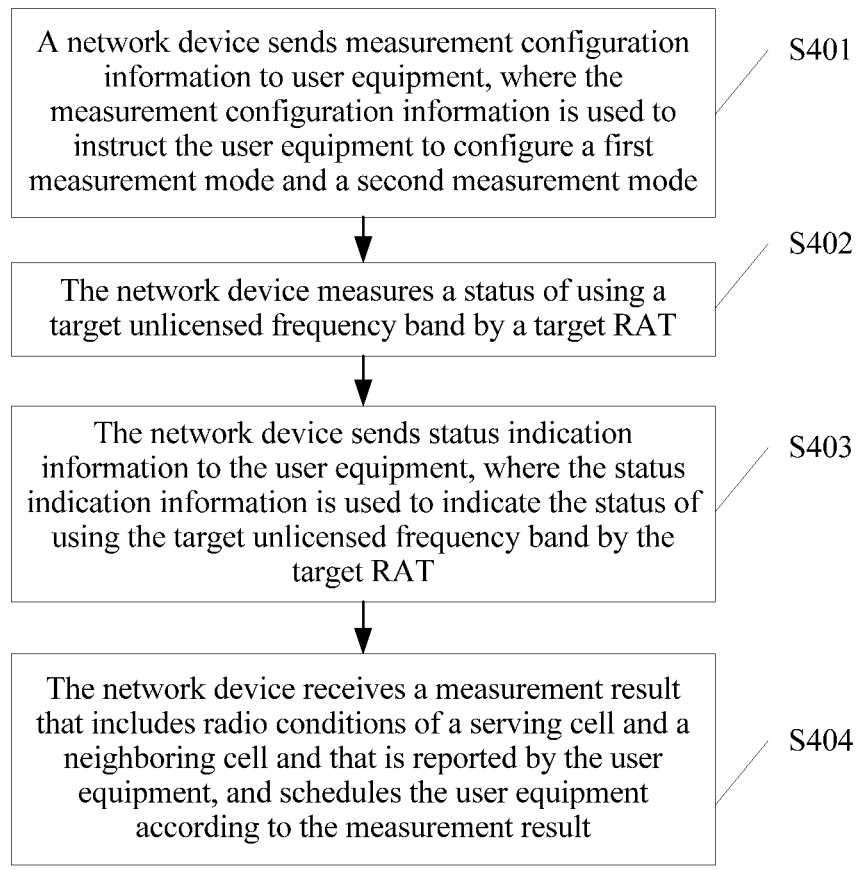
FIG. 10 is a schematic structural diagram of a network device according to a first embodiment of the present invention.

Referring to FIG. 10, FIG. 10 is a schematic flowchart of a measurement configuration method according to a second embodiment of the present invention. In this embodiment, the method includes the following steps:

S401. A network device sends measurement configuration information to user equipment, where the measurement configuration information is used to instruct the user equipment to configure a first measurement mode and a second measurement mode.

S402. The network device measures a status of using a target unlicensed frequency band by a target RAT.

S403. The network device sends status indication information to the user equipment, where the status indication information is used to indicate the status of using the target unlicensed frequency band by the target RAT.

Specifically, the network device probes, by using a spectrum sensing algorithm, the status of using the target unlicensed frequency band by the target RAT. The network device loads the detected usage status of the target unlicensed frequency band to the status indication message, and sends a status indication message to the user equipment.

S404. The network device receives a measurement result that includes a serving cell and a neighboring cell and that is reported by the user equipment, and schedules the user equipment according to the measurement result.

A serving base station determines a situation of an intra-system radio condition and/or interference or inter-system interference at a cell edge according to the measurement result, reported by the user equipment, of the first measurement mode or the second measurement mode for an intra-frequency neighboring cell, and performs corresponding processing for user equipment handover, serving cell power control, and interference coordination or coordinated multipoint transmission when the serving cell and an intra-frequency neighboring base station use LTE. For example, when the intra-frequency neighboring cell operates in LTE mode, when a radio condition such as RSRP of the serving cell is lower than a radio condition such as RSRP of the intra-frequency neighboring cell by a specific threshold, the serving base station instructs the UE to be handed over to the intra-frequency neighboring cell. For another example, when the serving cell can operate in LTE mode with the intra-frequency neighboring cell, the serving cell and the intra-frequency neighboring cell operate in a time-division mode, so as to avoid interference to cell-edge UE. For example, the serving cell may set an almost blank subframe (ABS) and notify the neighboring cell of configuration information of the almost blank subframe, so that the neighboring cell can schedule the cell-edge UE in the ABS subframe, so as to avoid interference. In this case, the serving cell and the neighboring cell may also schedule the cell-edge UE in a coordinated multipoint transmission (CoMP) manner in a mode such as joint transmission (JT) or dynamic point selection (DPS). For still another example, when the serving cell operates in LTE mode, and a spectrum resource of the neighboring cell is occupied by an inter-system, the serving cell may determine, according to a measurement result, reported by the UE, of inter-system interference of the neighboring cell, whether to schedule the cell-edge UE or whether to adjust a modulation and coding scheme (MCS).

Optionally, if the network device determines that the target RAT already occupies the target unlicensed frequency band, the network device instructs the user equipment to select the first measurement mode to measure a radio condition of the target unlicensed frequency band; or if the network device determines that the target RAT does not occupy the target unlicensed frequency band, the network device instructs the user equipment to select the second measurement mode to measure a radio condition of the target unlicensed frequency band.

Optionally, if the network device determines that the target RAT already occupies the target unlicensed frequency band, the network device measures the radio condition of the target unlicensed frequency band based on an uplink reference signal of the user equipment. For example, when the target RAT is an LTE radio access technology, the network device measures the radio condition of the target unlicensed frequency band according to a sounding reference signal (SRS) or a demodulation reference signal DMRS sent by the user equipment.

If the network device determines that the target RAT does not occupy the target unlicensed frequency band, the network device measures the radio condition of the target unlicensed frequency band based on physical measurement, spectrum analysis, or spectrum sensing for the target unlicensed frequency band.

Figure 11:
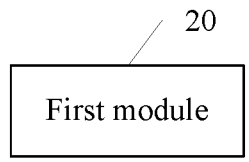
FIG. 11 is a schematic structural diagram of a network device according to a second embodiment of the present invention.

Referring to FIG. 11, FIG. 11 is a schematic structural diagram of a network device according to an embodiment of the present invention. In this embodiment, the network device includes:

a first module 20, configured to send measurement configuration information to user equipment, where the measurement configuration information is used to instruct the user equipment to configure a first measurement mode and a second measurement mode.

Figure 12:
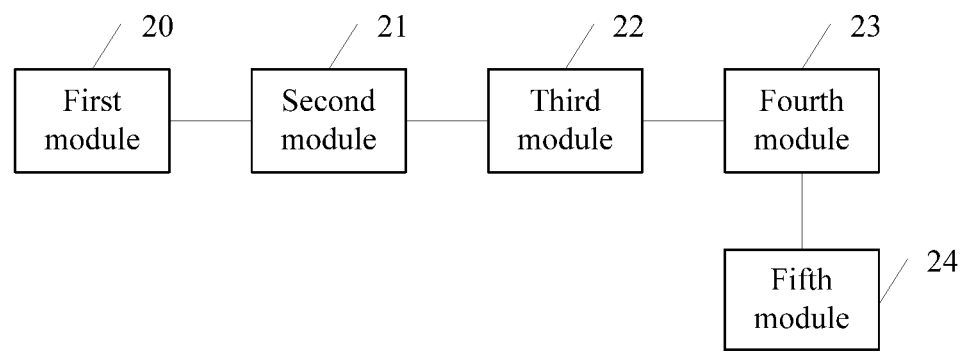
FIG. 12 is a schematic structural diagram of a network device according to a third embodiment of the present invention.

Further, referring to FIG. 12, in addition to including the first module 20, the network device further includes a second module 21, a third module 22, a fourth module 23, and a fifth module 24.

The second module is configured to: measure a status of using a target unlicensed frequency band by a target RAT; and send status indication information to the user equipment, where the status indication information is used to indicate the status of using the target unlicensed frequency band by the target RAT.

The third module is configured to: if it is determined that the target RAT already occupies the target unlicensed frequency band, instruct the user equipment to select the first measurement mode to measure a radio condition of the target unlicensed frequency band; or if it is determined that the target RAT does not occupy the target unlicensed frequency band, instruct the user equipment to select the second measurement mode to measure a radio condition of the target unlicensed frequency band.

The fourth module is configured to: if it is determined that the target RAT already occupies the target unlicensed frequency band, measure the radio condition of the target unlicensed frequency band based on an uplink reference signal of the user equipment; or if it is determined that the target RAT does not occupy the target unlicensed frequency band, measure the radio condition of the target unlicensed frequency band based on physical measurement, spectrum analysis, or spectrum sensing for the target unlicensed frequency band.

The fifth module, configured to: receive a measurement result that includes radio conditions of a serving cell and a neighboring cell and that is reported by the user equipment, and schedule the user equipment according to the measurement result.

Figure 13:
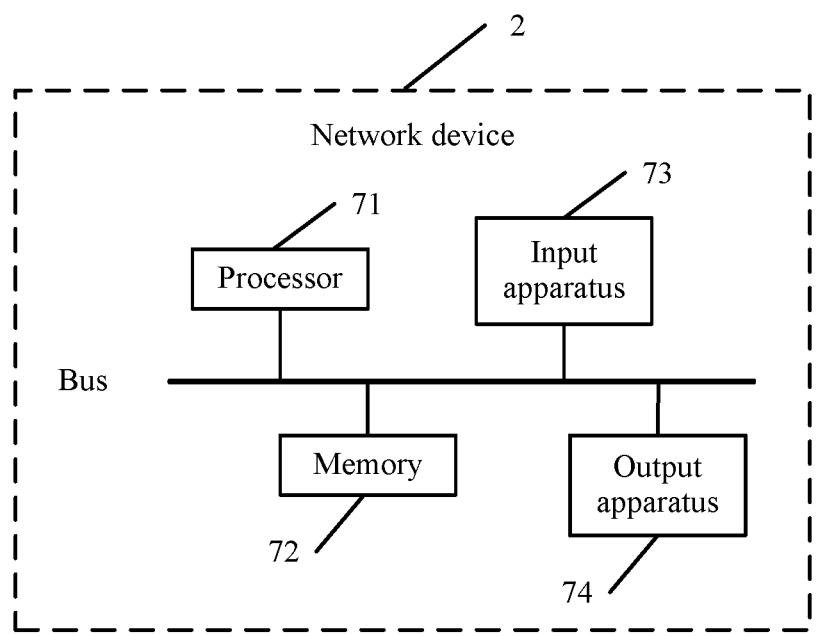
FIG. 13 is a flowchart of interworking of a communications system according to a first embodiment of the present invention.

Referring to FIG. 13, FIG. 13 is a schematic structural diagram of a network device according to a third embodiment of the present invention. The network device includes a processor 71, a memory 72, an input apparatus 73, and an output apparatus 74, where the network device may include one or more processors 71, and one processor is used as an example in FIG. 13. In some embodiments of the present invention, the processor 71, the memory 72, the input apparatus 73, and the output apparatus 74 may be connected by using a bus or in another manner, and a connection by using a bus is used as an example in FIG. 13.

The memory 72 stores a set of program code, and the processor 71 is configured to invoke the program code stored in the memory 72 to perform the following operation:

sending measurement configuration information to user equipment, where the measurement configuration information is used to instruct the user equipment to configure a first measurement mode and a second measurement mode.

Further, the processor 71 is further configured to perform:
measuring a status of using a target unlicensed frequency band by a target RAT; and
sending status indication information to the user equipment, where the status indication information is used to indicate the status of using the target unlicensed frequency band by the target RAT.

Further, the processor 71 is further configured to perform:
if it is determined that the target RAT already occupies the target unlicensed frequency band, instructing the user equipment to select the first measurement mode to measure a radio condition of the target unlicensed frequency band; or if it is determined that the target RAT does not occupy the target unlicensed frequency band, instructing the user equipment to select the second measurement mode to measure a radio condition of the target unlicensed frequency band.

Further, the processor 71 is further configured to perform:
if it is determined that the target RAT already occupies the target unlicensed frequency band, measuring the radio condition of the target unlicensed frequency band based on an uplink reference signal of the user equipment; or
if it is determined that the target RAT does not occupy the target unlicensed frequency band, measuring the radio condition of the target unlicensed frequency band based on physical measurement, spectrum analysis, or spectrum sensing for the target unlicensed frequency band.

Further, the processor 71 is further configured to perform:
receiving a measurement result that includes radio conditions of a serving cell and a neighboring cell and that is reported by the user equipment, and scheduling the user equipment according to the measurement result.

Figure 14:
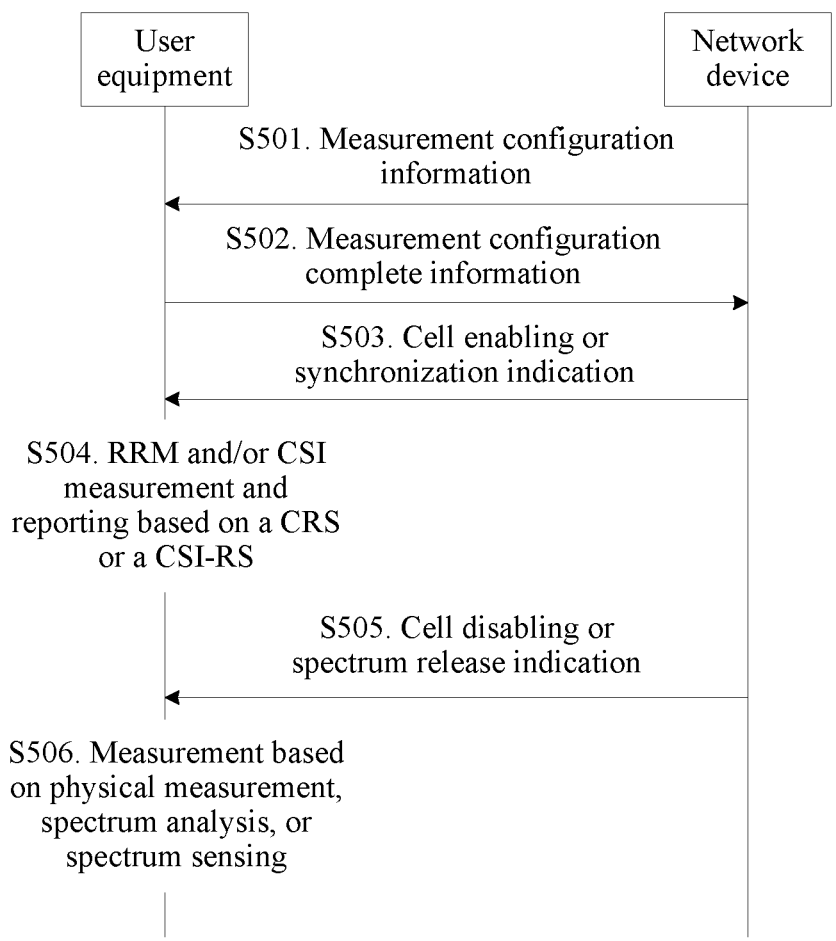
FIG. 14 is a flowchart of interworking of a communications system according to a second embodiment of the present invention.

Referring to FIG. 14, FIG. 14 is a flowchart of interworking of a communications system according to a first embodiment of the present invention. The interworking includes the following steps:

S501. A network device sends measurement configuration information to user equipment, and the network device configures two measurement modes for the user equipment (certainly, there may be more measurement modes), where each measurement mode is indicated by using a corresponding index value, and the network device may configure the measurement mode by using a radio resource control connection reconfiguration (RRC Connection Reconfiguration) message.

For example, in an LTE radio access technology, LTE obtains a spectrum resource in a secondary serving cell SCell on an unlicensed spectrum, a reference signal exists in the SCell, for example, a primary synchronization signal (PSS) and a secondary synchronization signal (SSS), a cell-specific reference signal (CRS), a channel state information-reference signal (CSI-RS), and/or a demodulation reference signal (DMRS).

After LTE releases the spectrum resource in the SCell on the unlicensed spectrum according to a spectrum specification and a measurement status of the network device and/or the user equipment, the foregoing signals such as the PSS/SSS, the CRS, and the CSI-RS no longer exist in the SCell, and a frequency corresponding to the SCell is occupied by an inter-system that shares the unlicensed spectrum, such as WiFi, or is in an idle state.

A first measurement mode indicates that the user equipment measures based on a reference signal of LTE, for example, the CRS, the CSI-RS, and/or the DMRS, and may include radio resource management (RRM) measurement and channel state information (CSI) measurement.

The RRM measurement may be measurement performed based on reference signal received power (RSRP) and reference signal received quality (RSRQ) of the CRS, the CSI-RS, and/or the DMRS. The CSI measurement includes a channel quality indicator (CQI), a precoding matrix indication (PMI), a rank indication (RI), and the like.

A second measurement mode indicates that the user equipment measures based on physical layer energy detection, covariance matrix detection), matched filtering detection, cyclostationary feature detection, eigenvalue-based spectrum sensing, a received signal strength indicator (RSSI), interference measurement, a signal-to-noise ratio (SNR), a signal to interference plus noise ratio (SINR), and rise over thermal (ROT. Because there is no LTE reference signal on the frequency corresponding to the SCell, the foregoing measurement performed by the UE may not rely on the LTE reference signal.

The foregoing measurement configuration information for the first measurement mode and the second measurement mode may further include a measurement object. For example, the measurement object is information such as a frequency, a measurement value (for example, RSRP and physical layer energy), a trigger condition of measurement reporting (for example, triggering periodically or triggering by an event), a threshold for starting/stopping measurement, and a threshold for measurement reporting.

S502. The user equipment receives the measurement configuration information from the network device, configures the foregoing related parameters according to the measurement configuration information, and sends a response message to the network device after completing configuration; for example, the response message may be a radio resource control connection reconfiguration complete (RRC Connection Reconfiguration Complete) message.

S503. LTE obtains a spectrum resource in an SCell on an unlicensed frequency band, and the network device sends synchronization signal, reference signal, and the like related to LTE and described in S501, and sends a cell enabling (cell on) indication, a synchronization indication (sync indication), and/or measurement mode indication information to the user equipment.

S504. The user equipment performs, according to the indication information and measurement configuration of the network device, measurement in a first measurement mode described in S501, and determines, according to a measurement reporting trigger condition, whether to report a measurement result to the network device, where the user equipment may report the measurement result to the network device by using a primary serving cell PCell, or report the measurement result to the network device by using the SCell when the SCell obtains the spectrum resource.

S505. LTE releases a spectrum resource in the SCell on the unlicensed spectrum according to a spectrum specification and a measurement status of the network device and/or the user equipment, and the network device stops sending the synchronization signal, the reference signal, and the like related to LTE and described in S501, and sends a cell disabling (cell off) indication, a spectrum release indication (spectrum release indication), and/or measurement mode indication information or measurement mode switching indication information to the user equipment.

S506. The UE performs, according to the indication information and the measurement configuration information of a base station, physical layer energy detection, RSSI measurement, and/or the like corresponding to a second measurement mode described in S501, and determines, according to the measurement reporting trigger condition, whether to report a measurement result to the network device.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The embodiments of the present invention are described in detail above. The principle and implementation of the present invention are described herein through specific examples. The description about the embodiments of the present invention is merely provided to help understand the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A method of measurement configuration, comprising:
   receiving, by a terminal from a base station, measurement configuration information;
   acquiring, by the terminal, a status of occupying a target unlicensed frequency band by a target radio access technology (RAT); and
   selecting, by the terminal, a first measurement mode to measure a radio condition of the target unlicensed frequency band when the target RAT currently occupies the target unlicensed frequency band, or selecting, by the terminal, a second measurement mode to measure the radio condition of the target unlicensed frequency band when the target RAT does not currently occupy the target unlicensed frequency band.

2. The method according to claim 1, wherein
   the first measurement mode indicates that the terminal, through the target RAT, performs measurement based on a synchronization signal or a reference signal;
   the second measurement mode indicates that the terminal, through the target unlicensed frequency band, performs measurement based on at least one of:
   physical measurement, spectrum analysis, or spectrum sensing.

3. The method according to claim 2, wherein the performing measurement based on a reference signal comprises:
performing radio resource management measurement or channel state information measurement when the reference signal is at least one of:
a cell reference signal, a channel state information reference signal, or a demodulation reference signal.

4. The method according to claim 1, wherein the second measurement mode comprises performing a received signal strength indicator measurement.

5. The method according to claim 1, wherein the acquiring further comprises:
receiving, by the terminal from the base station, status indication information used to indicate the status of using the target unlicensed frequency band by the target RAT; or
specifying, by the terminal, a subframe in a preset radio frame to detect the status of using the unlicensed frequency band by the target RAT.

6. An apparatus, comprising:
a non-transitory memory storing program instructions; and
at least one processor coupled to the memory, the program instructions being executable by the at least one processor to:
receive, from a base station, measurement configuration information;
acquire a status of occupying a target unlicensed frequency band by a target radio access technology (RAT); and
select a first measurement mode to measure a radio condition of the target unlicensed frequency band when the target RAT currently occupies the target unlicensed frequency band, or select a second measurement mode to measure the radio condition of the target unlicensed frequency band when the target RAT does not currently occupy the target unlicensed frequency band.

7. The apparatus according to claim 6, wherein the first measurement mode indicates performing, through the target RAT, measurement based on a synchronization signal or a reference signal;
the second measurement mode indicates performing, through the target unlicensed frequency band, measurement based on at least one of:
physical measurement, spectrum analysis, or spectrum sensing.

8. The apparatus according to claim 7, wherein the performing measurement based on a reference signal comprises:
performing radio resource management measurement or channel state information measurement when the reference signal is at least one of:
a cell reference signal, a channel state information reference signal, or a demodulation reference signal.

9. The apparatus according to claim 6, wherein the second measurement mode comprises performing a received signal strength indicator measurement.

10. The apparatus according to claim 6, wherein the program instructions are further executable by the at least one processor to:
receive, from the base station, status indication information used to indicate the status of using the target unlicensed frequency band by the target RAT; or
specify a subframe in a preset radio frame to detect the status of using the unlicensed frequency band by the target RAT.

11. An apparatus, comprising:
a non-transitory memory storing program instructions; and
at least one processor coupled to the memory, the program instructions being executable by the at least one processor to:
send measurement configuration information to a terminal, wherein the measurement configuration information instructs the terminal to configure a first measurement mode and a second measurement mode, the first measurement being used to measure a radio condition of a target unlicensed frequency band when a target radio access technology (RAT) currently occupies a target unlicensed frequency band, and the second measurement mode being used to measure the radio condition of the target unlicensed frequency band when the target RAT does not currently occupy the target unlicensed frequency band; and
send status indication to the terminal, wherein the status indication indicates a status of occupying the target unlicensed frequency band by the target RAT.

12. The apparatus according to claim 11, wherein the first measurement mode indicates performing, through the target RAT, measurement based on a synchronization signal or a reference signal; and
the second measurement mode indicates performing, through the target unlicensed frequency band, measurement based on at least one of:
physical measurement, spectrum analysis, or spectrum sensing.

13. The apparatus according to claim 11, wherein the program instructions are further executable by the at least one processor to:
send a downlink synchronization signal, a downlink reference signal, or downlink system information on the target unlicensed frequency band when the target RAT currently occupies the target unlicensed frequency band; or
determine to not send a downlink synchronization signal, a downlink reference signal, or downlink system information when the target RAT does not currently occupy the target unlicensed frequency band.

14. The apparatus according to claim 11, wherein the program instructions are further executable by the at least one processor to:
measure the status of using the target unlicensed frequency band by the target RAT.

15. A method of measurement configuration, comprising:
sending, by a base station, measurement configuration information to a terminal, wherein the measurement configuration information instructs the terminal to configure a first measurement mode and a second measurement mode, the first measurement mode being used to measure a radio condition of a target unlicensed frequency band when a target radio access technology (RAT) currently occupies a target unlicensed frequency band, and the second measurement mode being used to measure the radio condition of the target unlicensed frequency band when the target RAT does not currently occupy the target unlicensed frequency band; and
sending, by the base station, status indication to the terminal, wherein the status indication indicates a status of occupying the target unlicensed frequency band by the target RAT.

16. The method according to claim 15, wherein:

the first measurement mode indicates performing, through the target RAT, measurement based on a synchronization signal or a reference signal; and the second measurement mode indicates performing, through the target unlicensed frequency band, measurement based on at least one of:
physical measurement, spectrum analysis, or spectrum sensing.

17. The method according to claim 15, further comprising:

sending, by the base station, a downlink synchronization signal, a downlink reference signal, or downlink system information on the target unlicensed frequency band when the target RAT currently occupies the target unlicensed frequency band; or determining not to send, by the base station, a downlink synchronization signal, a downlink reference signal, or downlink system information when the target RAT does not currently occupy the target unlicensed frequency band.

18. The method according to claim 15, further comprising:

measuring the status of using the target unlicensed frequency band by the target RAT.

\* \* \* \* \*